(12) United States Patent
Huber et al.

(10) Patent No.: US 7,932,629 B2
(45) Date of Patent: Apr. 26, 2011

(54) METHOD FOR CONTROLLING A GENERATION OF AN ALTERNATING CURRENT IN A VEHICLE

(75) Inventors: Thomas Huber, Daisbach (DE); Boyke Richter, Karlsruhe (DE); Ellen Mailaender, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 265 days.

(21) Appl. No.: 12/217,816

(22) Filed: Jul. 8, 2008

(65) Prior Publication Data

US 2009/0021967 A1    Jan. 22, 2009

(30) Foreign Application Priority Data

Jul. 20, 2007    (DE) .......................... 10 2007 034 027

(51) Int. Cl.
*H02H 7/18*    (2006.01)
*H02J 7/00*    (2006.01)

(52) U.S. Cl. ...................................... 307/10.7; 320/140

(58) Field of Classification Search ................. 307/10.7; 320/140

See application file for complete search history.

(56) References Cited

U.S. PATENT DOCUMENTS

| 6,659,213 B2 * | 12/2003 | Kubo et al. ................. 180/65.26 |
| 6,812,670 B2 * | 11/2004 | Minamiura et al. .......... 320/116 |
| 7,677,342 B2 * | 3/2010 | Yonemori et al. ....... 180/65.285 |

FOREIGN PATENT DOCUMENTS

DE    37 43 317    6/1989

* cited by examiner

*Primary Examiner* — Hal I Kaplan
(74) *Attorney, Agent, or Firm* — Kenyon & Kenyon LLP

(57) ABSTRACT

In a method for controlling a generation of an alternating current in a vehicle equipped with a battery and an inverter, the inverter is electrically connectable to the battery in order to generate an alternating current from a direct current of the battery for electrical devices that are electrically connectable to the inverter, and the battery is recharged when a charging state of the battery is equal to or less than a threshold value that is sufficient to generate an alternating current required for the electrical devices.

8 Claims, 3 Drawing Sheets

METHOD FOR CONTROLLING A GENERATION OF AN ALTERNATING CURRENT IN A VEHICLE

BACKGROUND OF THE INVENTION

1. Field of the Invention

The present invention relates to a method for controlling a generation of an alternating current in a vehicle, the method having the features according to the definition in claim 1.

2. Description of Related Art

Mobile power generators that supply alternating currents of 230V at 50 Hz and with outputs of up to 10 kW are available commercially.

Inverters are used for the generation of an alternating current from a direct current such as in a vehicle electrical system. Various designs of inverters are known depending on the particular requirements with regard to voltage, current, frequency and environmental conditions.

Published German patent document DE 3743317 describes a vehicle electrical system in which a DC/AC converter generates an alternating voltage of 220 Volt and 50 Hertz.

One disadvantage of the known generation of alternating current in the case of a vehicle is that only a limited energy quantity can be produced and thus only a limited number of electrical consumers such as a refrigerator, a stereo system etc. can be supplied with current.

Another disadvantage is that it is impossible to provide different electrical alternating outputs as called for by the individual requirements.

A further disadvantage is that electrical consumers can be supplied with alternating currents only for a limited time until, for example, a battery of the vehicle has been depleted.

BRIEF SUMMARY OF THE INVENTION

An object of the present invention is to provide a method for controlling a generation of an alternating current in a vehicle, which allows a flexible and unlimited supply of a 230V alternating current at 50 Hz of different outputs by a vehicle, e.g., a hybrid vehicle.

One advantage of the method according to the present invention is the availability of a 230 V alternating current in a vehicle for the operation of conventional electrical devices. Furthermore, due to an automatic recharging function, it is possible to cover a large energy requirement.

In one example implementation of the method of the present invention it is checked whether an alternating current is required for electrical devices, and if no alternating current is required for electrical devices, then no alternating current will be generated and no recharging of the battery will take place.

One advantage of this example implementation is that it achieves a more efficient generation of alternating current and one that is based on need.

In another example implementation of the method of the present invention, when an alternating current is required for electrical devices, then it is checked whether a mechanical connection exists between a combustion engine of the vehicle and a driven axle of the vehicle, and if no mechanical connection exists, then the battery is electrically connected to the inverter, an alternating current is generated, and the battery recharged.

In another example implementation of the method of the present invention, if a mechanical connection exists, then it is checked whether the mechanical connection is required, and if the mechanical connection is required, then no alternating current is generated, and the battery not recharged.

In another example implementation of the method of the present invention, if the mechanical connection is not required, then the mechanical connection is reversed and the battery is electrically connected to the inverter, the alternating current is generated and the battery recharged.

In another example implementation of the method of the present invention, the recharging step includes a startup of a combustion engine of the vehicle and an operation of an electric drive of the vehicle using the combustion engine in order to generate electric power for charging the battery.

One advantage of this example implementation is that it allows a flexible generation of alternating current by a vehicle.

In another example implementation of the method of the present invention, the output of the combustion engine is increased to the point where the battery is charged with a suitable electric power.

One advantage of this example implementation is that it allows an efficient generation of alternating current by a vehicle.

In another example implementation of the method of the present invention, the recharging of the battery is terminated when the charge state of the battery is greater than the threshold value.

Furthermore, the method according to the present invention may advantageously be used by a control for controlling a generation of an alternating current in a vehicle equipped with a battery and an inverter, the inverter being electrically connectable to the battery in order to generate an alternating current from a direct current of the battery for electrical devices that are able to be electrically connected to the inverter.

BRIEF DESCRIPTION OF THE VARIOUS FIGURES OF THE DRAWING

FIG. 1 schematically illustrates a system of a hybrid vehicle.

DETAILED DESCRIPTION OF THE INVENTION

Figure 1:
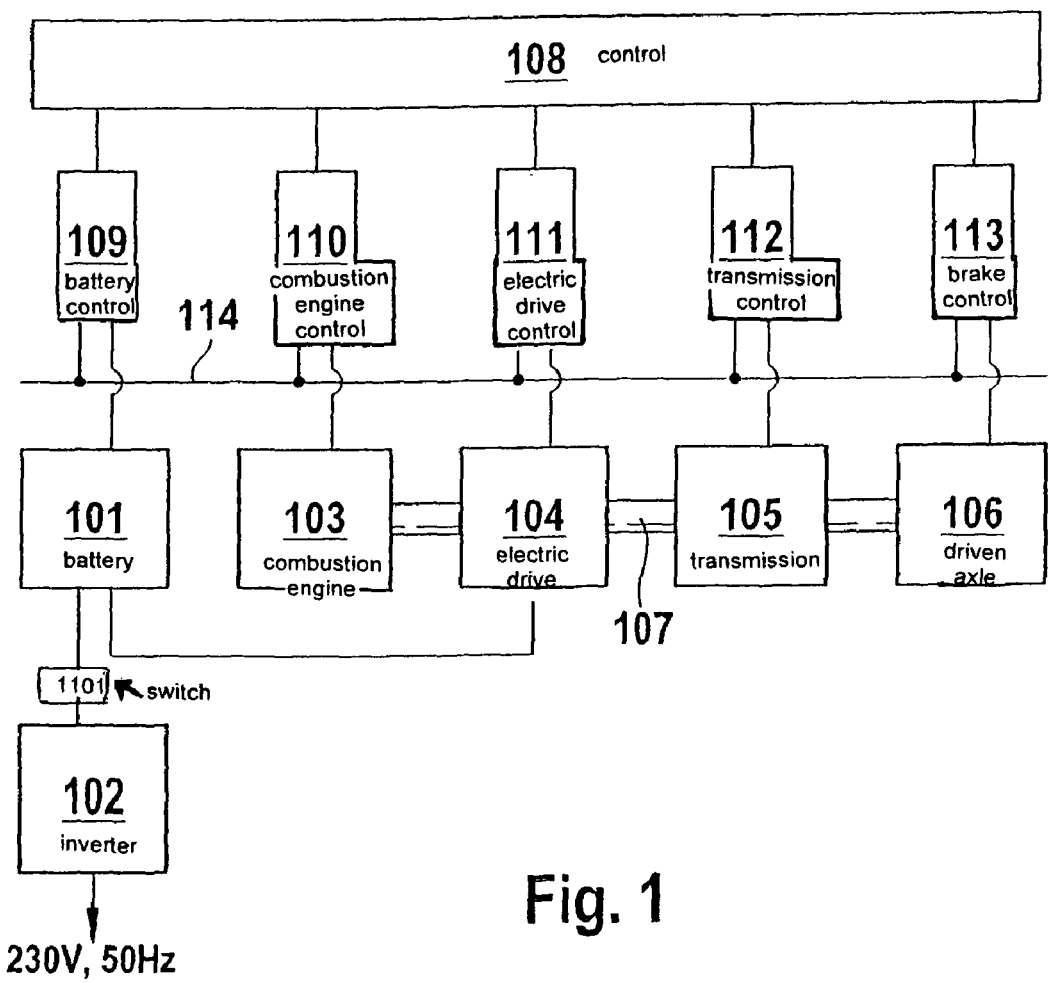

FIG. 1 schematically illustrates a system of a hybrid vehicle. The system includes a battery 101, an inverter 102, a combustion engine 103, an electric drive 104, a transmission 105, and a driven axle 106 with a brake system. Combustion engine 103, electric drive 104, transmission 105, and driven axle 106 form a drive train 107. In addition, the system includes a control 108 of the hybrid vehicle, a battery control 109 for monitoring and controlling battery 101, a combustion engine control 110 for monitoring and controlling combustion engine 103, an electric drive control 111 for monitoring and controlling electric drive 104, a transmission control 112 for monitoring and controlling transmission 105, a brake control 113 for monitoring and controlling the brake system, and a bus 114. Battery control 109, combustion engine control 110, electric drive control 111, transmission control 112, and brake control 113 are able to communicate with each other via bus 114.

Control 108 of the hybrid vehicle is connected to the individual controls 109-113. Electric drive 104 is electrically connectable to battery 101 for its operation and for charging battery 101. Furthermore, battery 101 is electrically connectable to inverter 102 to generate a 230V alternating current with 50 Hz from a direct current of battery 101. Inverter 102 has its own control, which is connected to an electric drive control 111 and thereby to control 108 of the hybrid vehicle (not shown). To generate an alternating current, battery 101 is activated, preferably via battery control 109, and the required alternating current is provided by inverter 102. Battery 101 is connected to inverter 102 for this purpose, preferably via a switch 1101.

All components such as combustion engine 103, electric drive 104, battery 101, transmission 105, etc. are able to be controlled in coordinated fashion via control 108 of the hybrid vehicles. If the charge state of battery 101 is low, then control 108 is able to automatically initiate recharging of battery 101.

Figure 2:
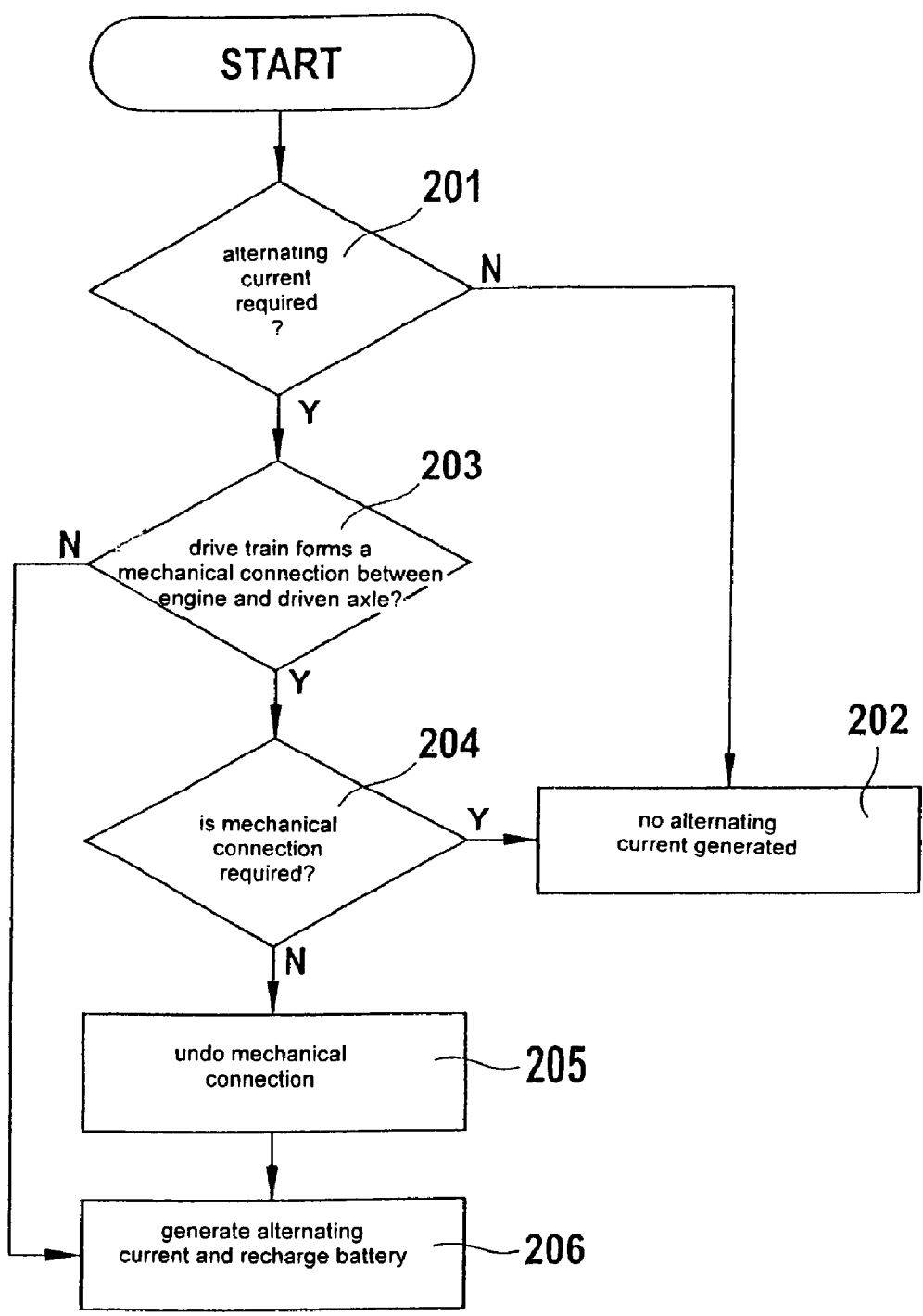
FIG. 2 shows a flowchart of an exemplary method for controlling a generation of an alternating current in a vehicle.

FIG. 2 shows an exemplary embodiment of a method for controlling a generation of an alternating current in a vehicle, which is preferably implemented by control 108 of the hybrid vehicle.

In a first step 201, it is checked whether a 230V alternating current having 50 Hz is required for electrical devices, such as a refrigerator or a stereo system, for instance. If no alternating current is required for electrical devices (N: No), then no alternating current is generated, and the battery is not recharged 202.

If an alternating current is required for electrical devices (Y: Yes), then it is checked in a following step 203 whether drive train 107 currently forms a mechanical connection, such as a friction-locked connection, between combustion engine 103 and driven axle 106.

If a mechanical connection is present (Y), then it is checked in a following step 204 whether the mechanical connection is required, for instance for the purpose of moving the vehicle. If the mechanical connection is required (Y), then no alternating current is generated and the battery is not recharged 202. If the mechanical connection is not required (N), then the mechanical connection is reversed in a step 205.

If no mechanical connection (N) is present in step 203, such as in a neutral position of transmission 105, or if the mechanical connection was reversed in step 205, then battery 101 is electrically connected to inverter 102, and an alternating current is generated by the inverter and corresponding recharging of battery 101 is initiated 206.

Figure 3:
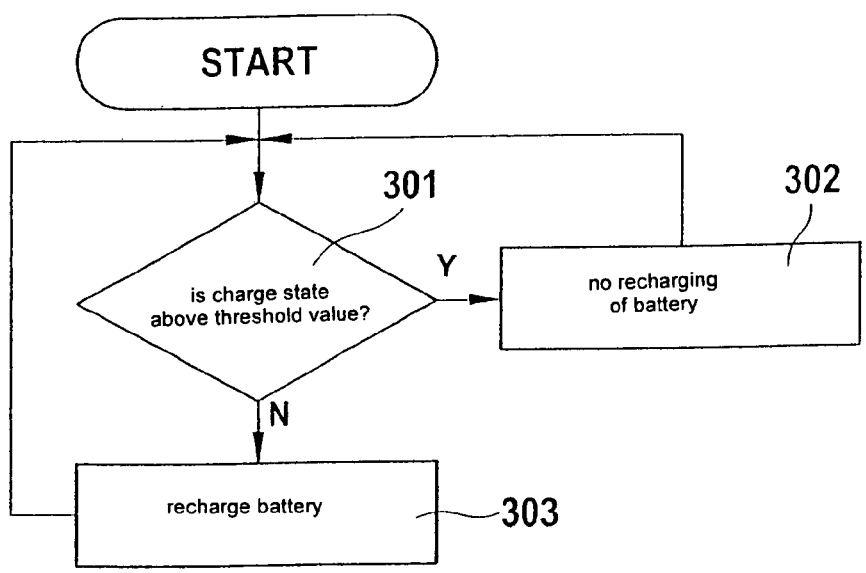
FIG. 3 shows a flowchart of an exemplary method for controlling a recharging of a battery of the vehicle.

FIG. 3 shows a method for controlling a recharging of the battery of the vehicle.

In a step 301 of the method, it is checked whether the battery charge state is above an applicable threshold value. If the battery state is above the threshold value (Y), then inverter 102 supplies the requested alternating current by withdrawing energy from battery 101, and no recharging takes place or the recharging is terminated 302. If the battery charge state is equal to the threshold value or drops below the threshold value (N), then recharging of the battery is initiated 303. The charge state of battery 101 is monitored continuously during recharging of battery 101, and the recharging is terminated 302 as soon as the charge state exceeds the threshold value.

Figure 4:
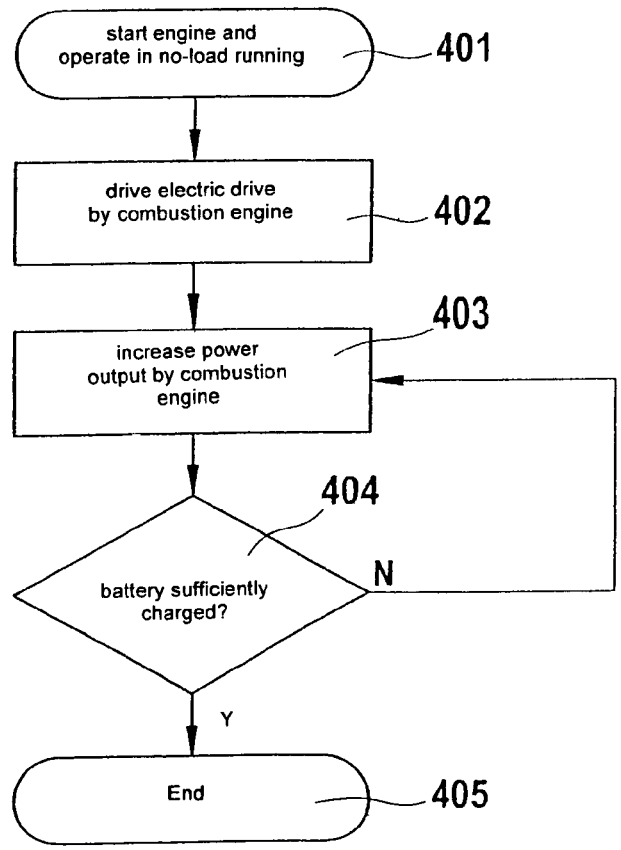
FIG. 4 shows a flowchart of an exemplary method for recharging the battery of the vehicle.

FIG. 4 shows a method for recharging the battery of the vehicle.

In a step 401 of the method, combustion engine 103 is started if necessary, and initially operated in no-load running. In a following step 402, driving of electric drive 104 by combustion engine 103 is induced in order to generate an electrical output for charging battery 101.

In a step 403, the power output of combustion engine 103 is increased until it is determined in a subsequent step 404 that the battery is charged with an applicable or suitable electric power. If this is the case (Y), then the method shown in FIG. 4 is terminated 405. The setting of the output of combustion engine 103 is implemented by specifying the rotational speed and torque as a function of the requested power output. The rotational speed and the torque are available for this purpose in the form of applicable characteristic curves, for example. On the basis of information from battery control 109, it may be determined whether battery 101 is charged or discharged overall and how large the effective charging power is at battery 101.

The present invention is able to be used in any vehicle equipped with a combustion engine and a generator or an electric motor that may be operated as generator, and it may be used, in particular, in an electric hybrid vehicle in which a battery, an electric drive and a combustion engine are able to be controlled in coordinated fashion.

Although the present invention has been described above with reference to exemplary embodiments, it is not limited thereto but rather is modifiable in many ways.

What is claimed is:

1. A method for controlling a generation of an alternating current in a vehicle equipped with a battery and an inverter, comprising:
   selectively connecting the inverter electrically to the battery in order to generate an alternating current from a direct current of the battery for electrical devices electrically connectable to the inverter;
   recharging the battery when a charge state of the battery is one of equal to or less than a threshold value sufficient to generate an alternating current required for the electrical devices;
   checking whether an alternating current is required for at least one electrical device; and
   if no alternating current is required for at least one electrical device, then no alternating current is generated and the battery is not recharged.

2. The method as recited in claim 1, further comprising:
   if an alternating current is required for at least one electrical device, then checking whether a mechanical connection exists between a combustion engine of the vehicle and a driven axle of the vehicle; and
   if no mechanical connection exists, then electrically connecting the battery to the inverter, generating the alternating current, and recharging the battery.

3. The method as recited in claim 2, further comprising:
   if a mechanical connection exists, then checking whether the mechanical connection is required;
   if the mechanical connection is required, no alternating current is generated and the battery is not recharged.

4. The method as recited in claim 3, further comprising:
   if the mechanical connection is not required, then reversing the mechanical connection, the battery is electrically connected to the inverter, the alternating current is generated, and the battery is recharged.

5. The method as recited in claim 2, wherein the step of recharging the battery includes:
   starting-up of the combustion engine of the vehicle; and
   driving an electric drive using the combustion engine in order to generate an electrical power for recharging the battery.

6. The method as recited in claim 5, wherein the step of recharging the battery further includes:
   increasing the output of the combustion engine until the battery is charged with a required electrical power.

7. The method as recited in claim 2, further comprising:
if the charge state of the battery exceeds the threshold value, then terminating the recharging of the battery.

8. A unit for controlling a generation of an alternating current in a vehicle equipped with a battery and an inverter, comprising:
a controller configured to implement the following:
controlling selective connection of the inverter electrically to the battery in order to generate an alternating current from a direct current of the battery for electrical devices electrically connectable to the inverter;
controlling recharging of the battery when a charge state of the battery is one of equal to or less than a threshold value sufficient to generate an alternating current required for the electrical devices;
checking whether an alternating current is required for at least one electrical device;
checking whether a mechanical connection exists between a combustion engine of the vehicle and a driven axle of the vehicle, if an alternating current is required for at least one electrical device; and
electrically connecting the battery to the inverter if no mechanical connection exists between the combustion engine of the vehicle and the driven axle of the vehicle.

* * * * *